United States Patent [19]
Blair et al.

[11] 3,754,302
[45] Aug. 28, 1973

[54] POULTRY CARCASS-TREATING PROCESS AND APPARATUS

[75] Inventors: James M. Blair, Mt. Prospect; Michael Sebring, Downers Grove, both of Ill.; Warren H. Underwood; William P. Bley, both of Minneapolis, Minn.

[73] Assignee: Armour and Company, Chicago, Ill.

[22] Filed: Jan. 14, 1971

[21] Appl. No.: 106,492

[52] U.S. Cl. .................................. 17/45, 99/107
[51] Int. Cl. ............................................ A22c 21/00
[58] Field of Search .................. 17/11, 45; 99/107

[56] References Cited
UNITED STATES PATENTS

| | | |
|---|---|---|
| 2,560,067 | 7/1951 | Bell .......................................... 17/11 |
| 3,104,418 | 9/1963 | Segur ....................................... 17/11 |
| 3,213,487 | 10/1965 | Reynolds ................................. 17/11 |
| 3,541,634 | 11/1970 | Panek ...................................... 17/11 |

*Primary Examiner*—Lucie H. Laudenslager
*Attorney*—Carl C. Batz

[57] ABSTRACT

A dressed raw poultry carcass, with its front portion engaging an abutment, is pressed from the rear to clamp the carcass against the abutment, and side rails carry arms rearwardly to engage the knees of the bird, thus positioning the carcass firmly for fluid injection or other treatment.

9 Claims, 34 Drawing Figures

Patented Aug. 28, 1973
3,754,302
11 Sheets-Sheet 1
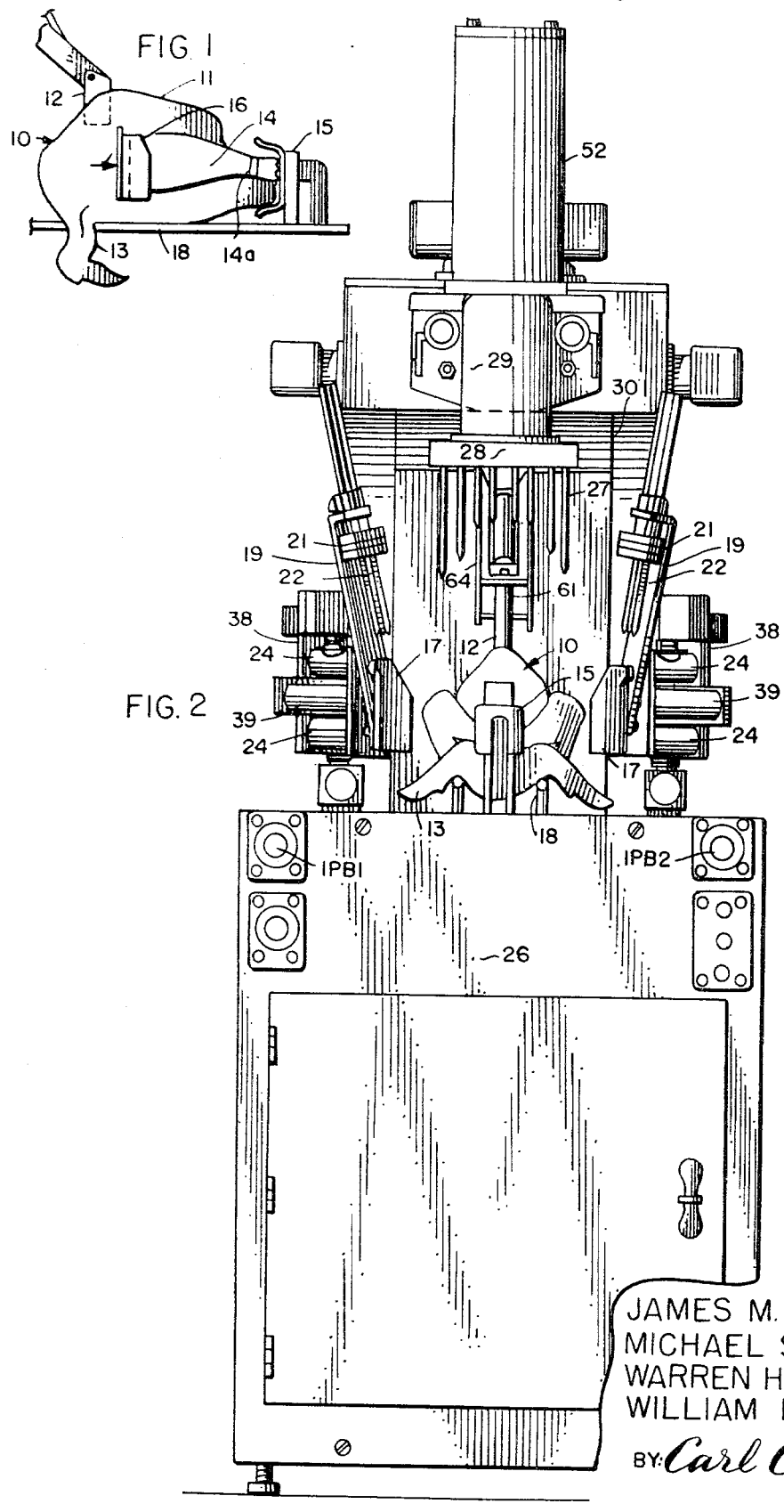
INVENTORS:
JAMES M. BLAIR
MICHAEL SEBRING
WARREN H. UNDERWOOD
WILLIAM P. BLEY
BY: *Carl C. Batz*
ATT'Y

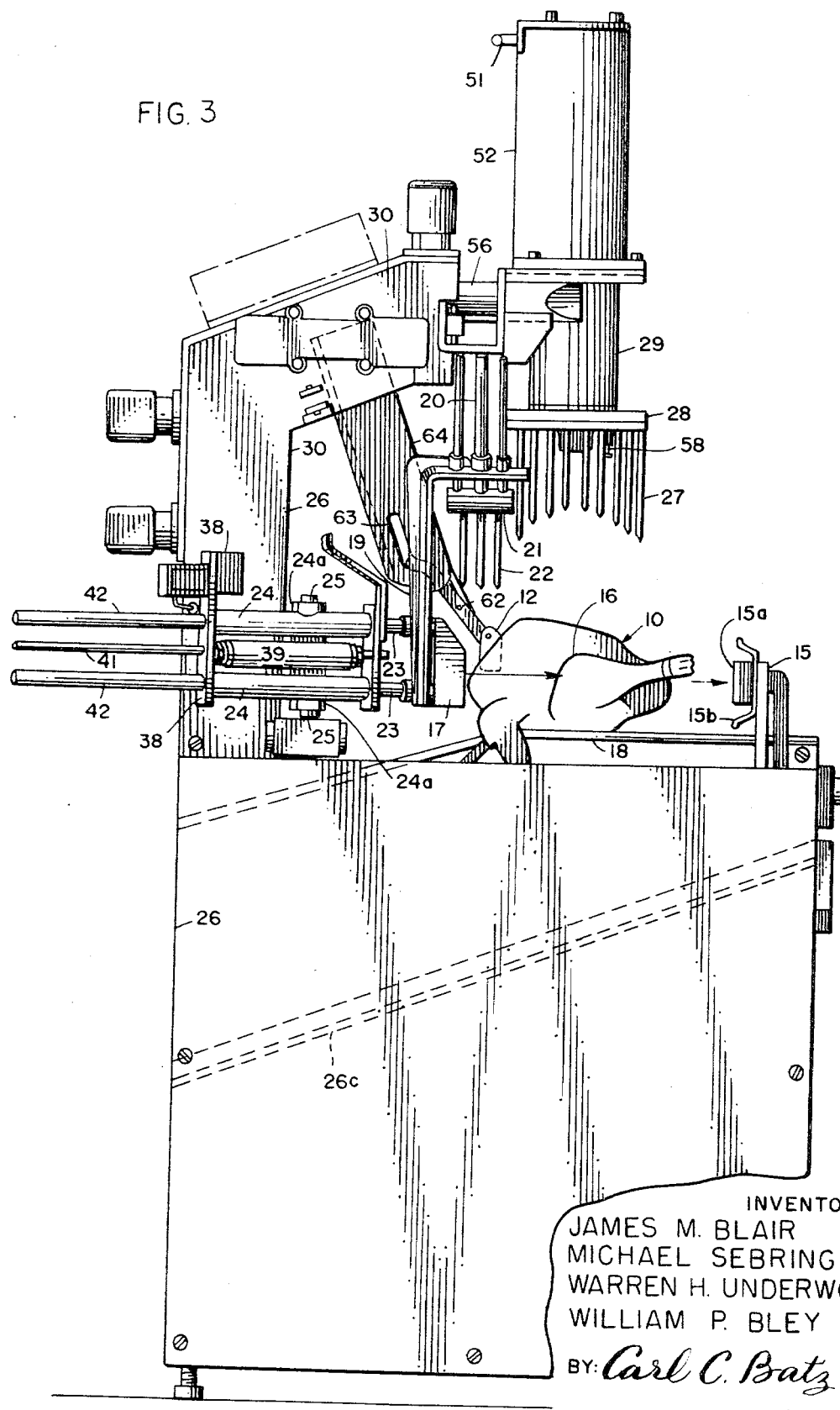

Patented Aug. 28, 1973

INVENTORS:
JAMES M. BLAIR
MICHAEL SEBRING
WARREN H. UNDERWOOD
WILLIAM P. BLEY
BY: *Carl C. Batz*
ATT'Y

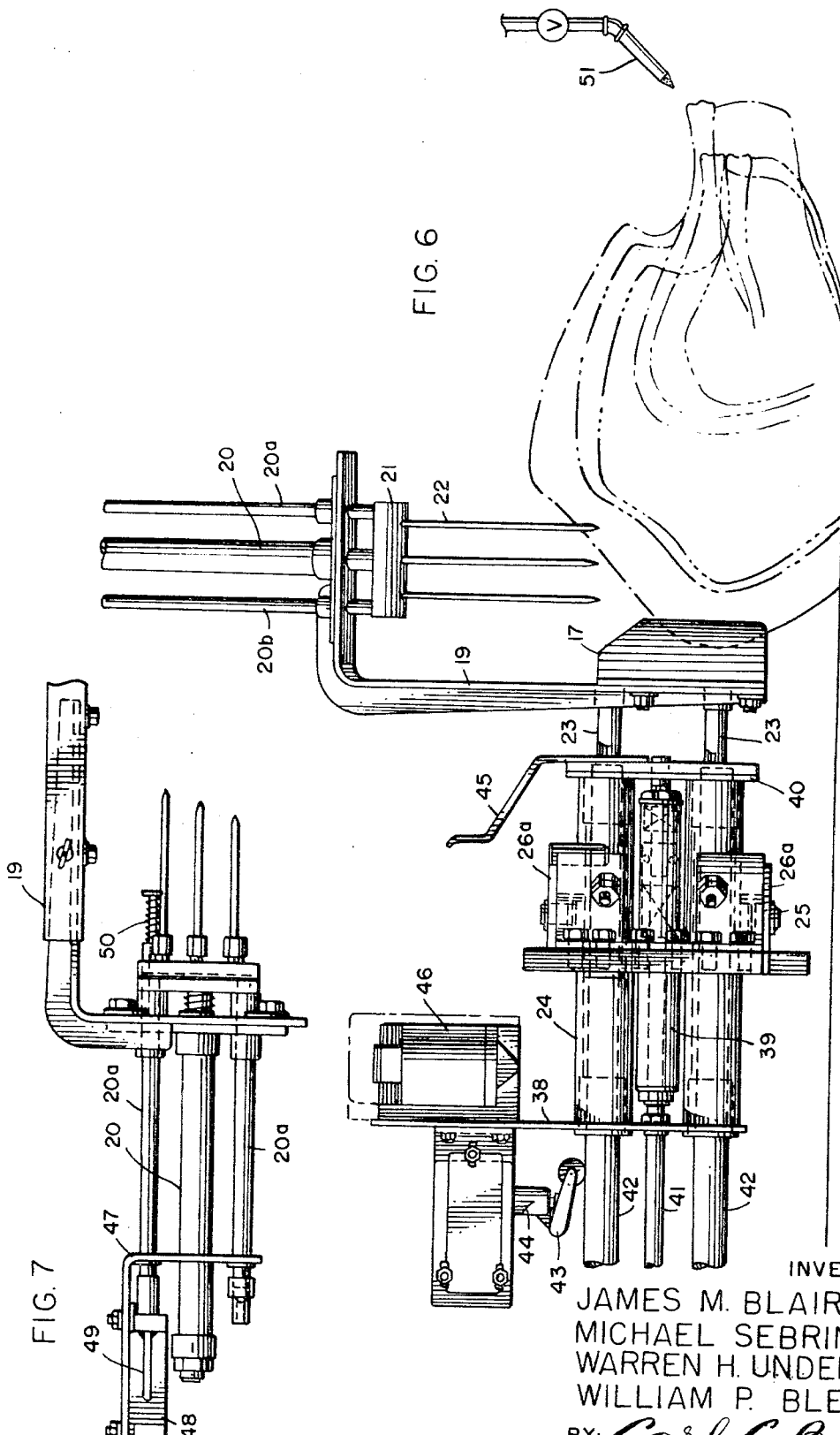

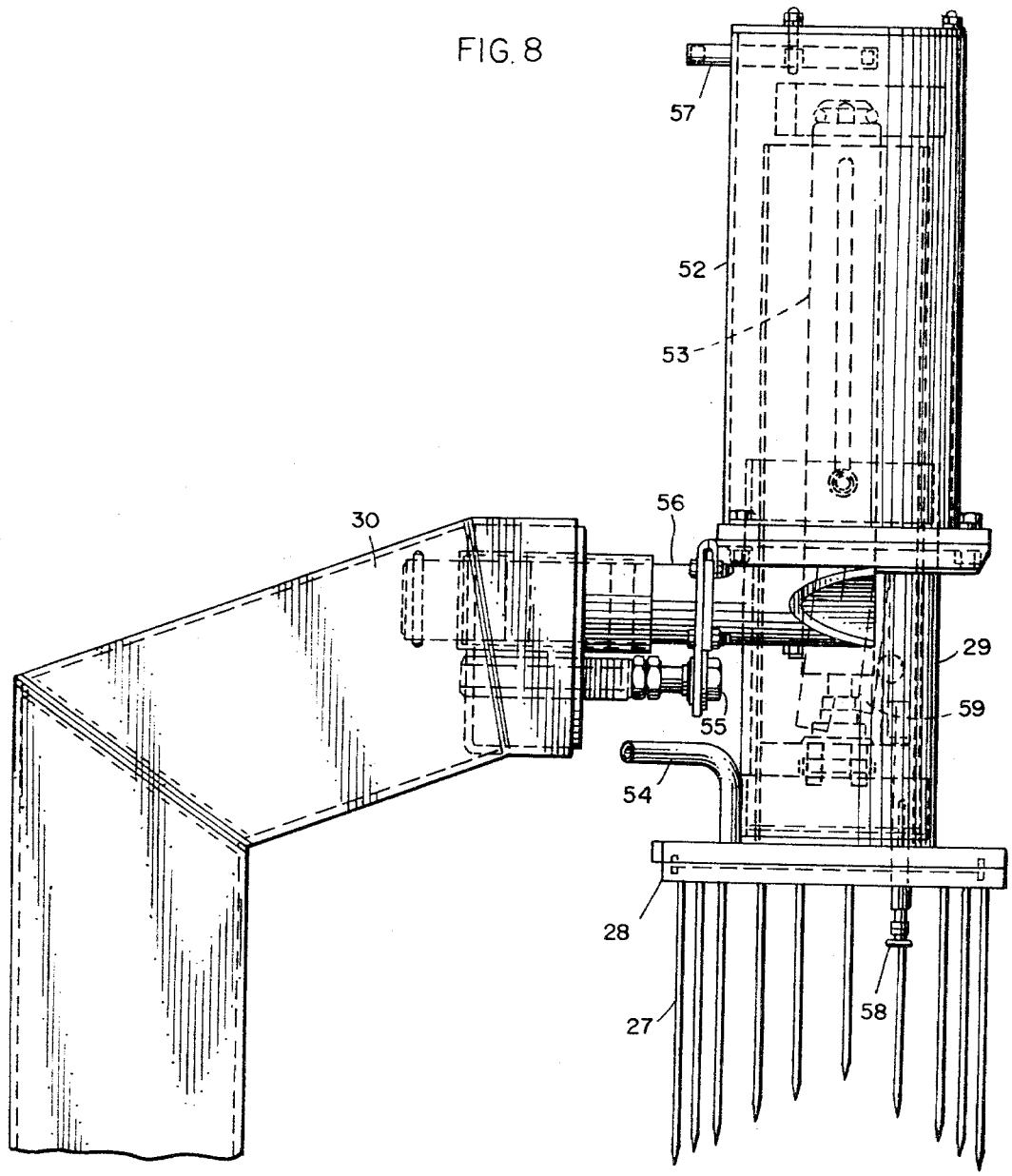

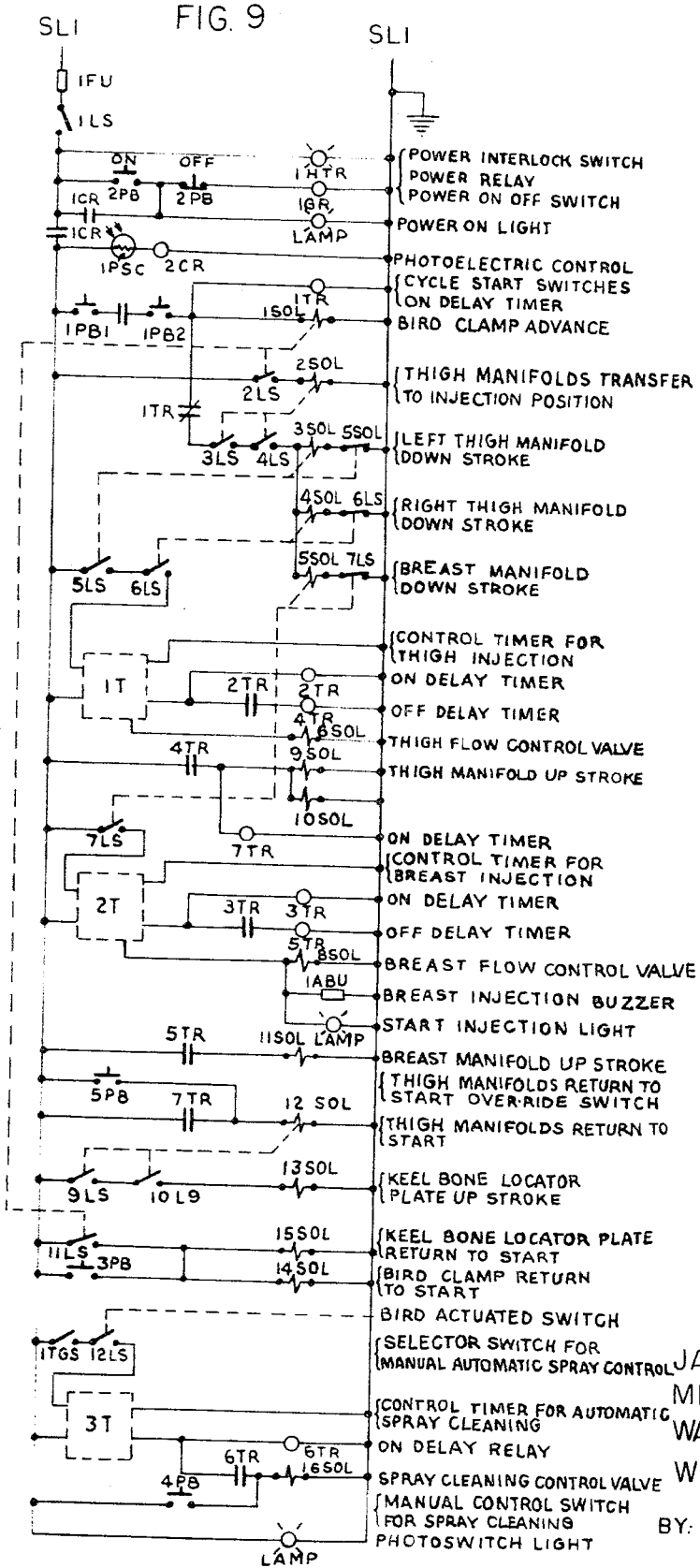
FIG. 9
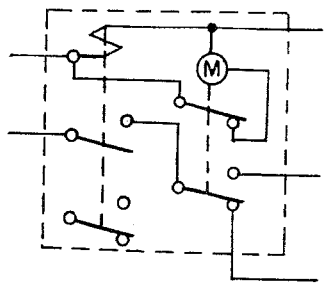
FIG. 9A = 1T
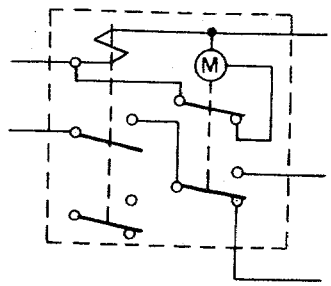
FIG. 9B = 2T
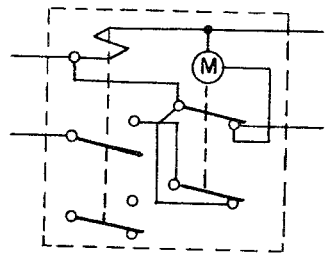
FIG. 9C = 3T
INVENTORS:
JAMES M. BLAIR
MICHAEL SEBRING
WARREN H. UNDERWOOD
WILLIAM P. BLEY
BY: Carl C. Batz
ATT'Y Patented Aug. 28, 1973

INVENTORS:
JAMES M. BLAIR
MICHAEL SEBRING
WARREN H. UNDERWOOD
WILLIAM P. BLEY
BY: *Carl C. Batz*
ATT'Y Patented Aug. 28, 1973

INVENTORS:
JAMES M. BLAIR
MICHAEL SEBRING
WARREN H. UNDERWOOD
WILLIAM P. BLEY
BY: *Carl C. Batz*
ATT'Y

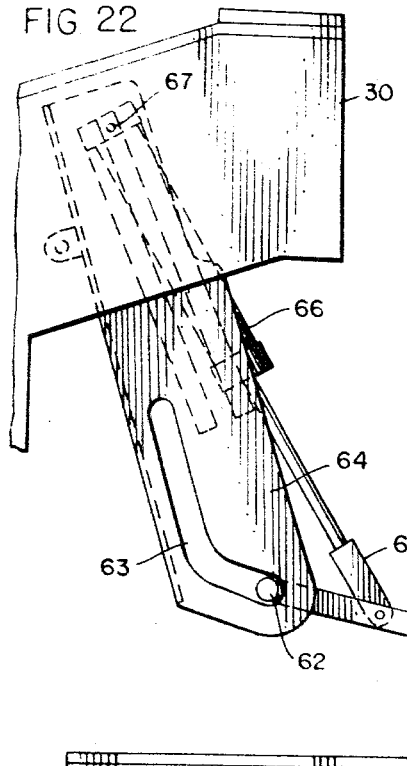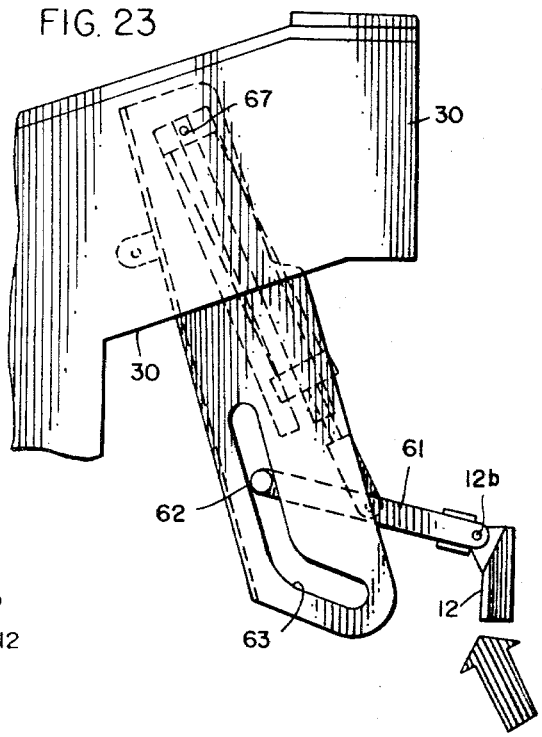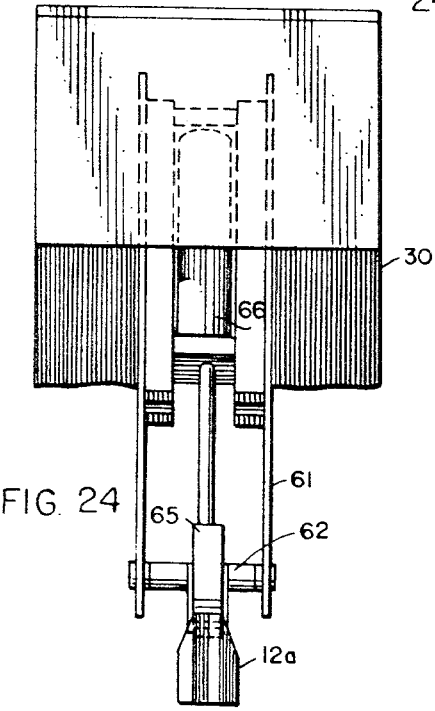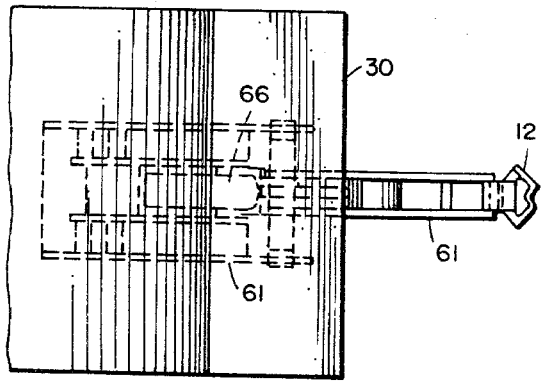

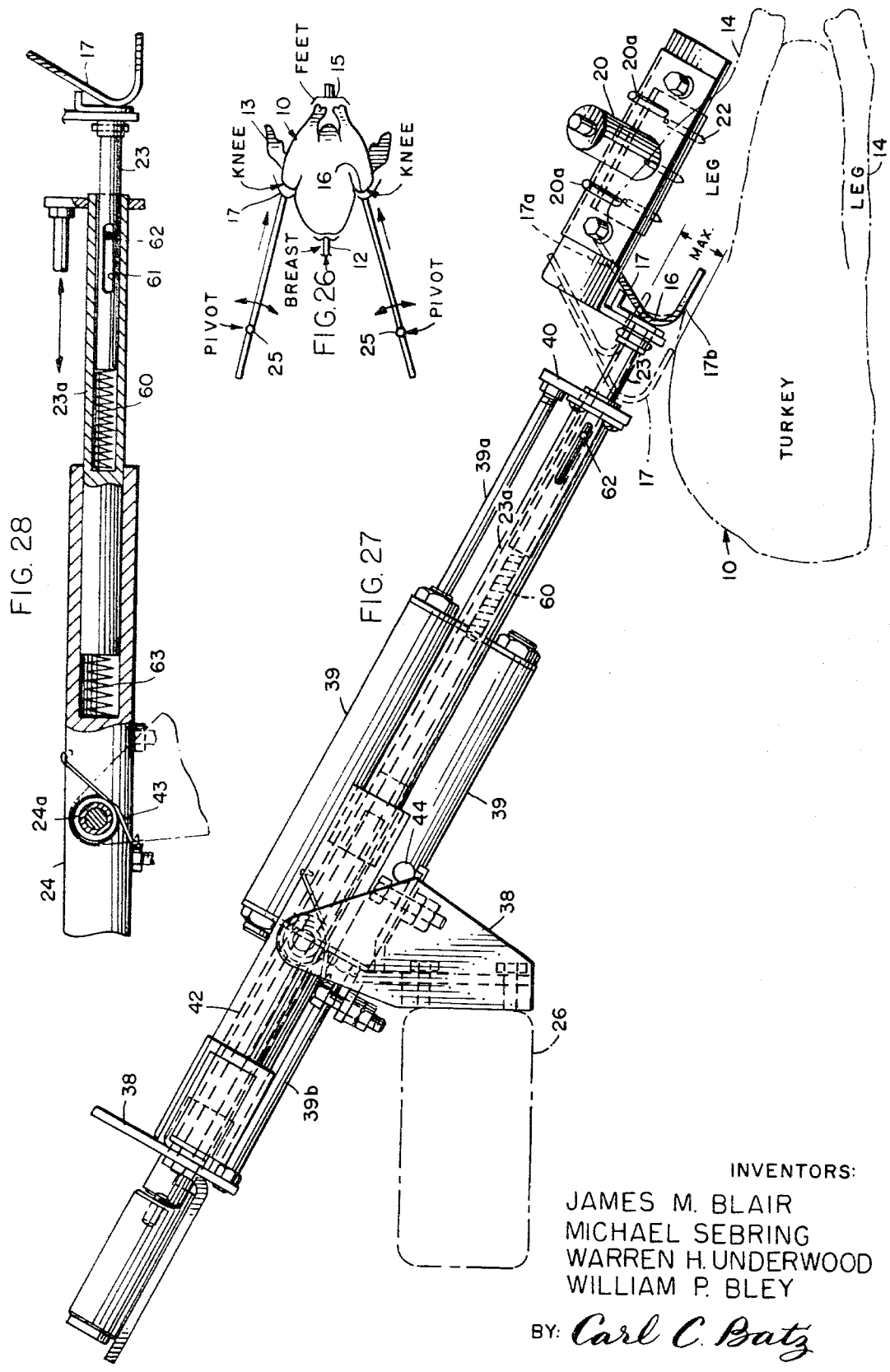

Patented Aug. 28, 1973

INVENTORS:
JAMES M. BLAIR
MICHAEL SEBRING
WARREN H. UNDERWOOD
WILLIAM P. BLEY
BY: Carl C. Batz
ATT'Y

POULTRY CARCASS-TREATING PROCESS AND APPARATUS

BACKGROUND AND SUMMARY

In the processing of poultry carcasses following cleaning, eviscerating, etc., the foot portion is cut away and the ends of the legs at the posterior of the carcass are wire-trussed together to provide hock clamps above the end of the backbone structure. After the usual chilling, the thigh portion over the femur bone and the leg portion over the tibiotarsus bone become relatively rigid and the knee joint therebetween projects forwardly. The wing portions extend outwardly and slightly downwardly.

Attempts to treat or streamline process such irregularly-shaped bodies by machine and process steps have long presented a problem. Not only are the carcasses difficult to handle by reason of the irregular shapes and projections, but also during the chilling and storing operations the wing and leg portions become further misshapen. Added to this fact that the carcasses come in varying sizes, both in length and height and other body conformations, and it is important that in an injection process employing hollow needles, etc. such implements must miss the bone structure and accurately penetrate the muscle portion.

A very real problem is to find a way for positioning the bird carcass for the treatment so that it is firmly and accurately held irrespective of size or conformation, while at the same time mechanically positioning the needles or other treating elements with respect to a key point of the carcass portion engaged in the positioning step so that the needles miss the bone structure and find proper location in the muscle meat.

We have discovered that a removable elongated abutment or stop can be provided for engaging an interior portion of the dressed carcass for clamping and centering the carcass for the treating operation when the carcass is pushed or pressed against the abutment. Further, we have discovered that side slide rails can be provided with cam sockets for gripping the knees of the bird to further fix it in position for treatment. By equipping the rails with needles, etc. and supporting them for tilting and play, the hunting action of the rail cam sockets against the rigid knees of the carcass aligns the needles so that they miss the bone and find the knee and thigh muscle meat. Moving the abutment away permits ejection of the processed bird and restores the apparatus for receiving another carcass.

In the process, a socket pusher engages not only the backbone and hock portion of the carcass but also the clamped leg-ends, and thus a substantial force can be applied through the bone structure to clamp the carcass against the centering abutment or post.

Forward of the breast bone of the bird is a V-shaped recess and when this receives the depending generally-vertical locator post and the carcass is pressed forwardly against it from the rear, there is an accurate alignment of the bird carcass so that the injection needles will miss the keel bone and be properly located in the breast muscle meat. Thus, irrespective of the bird's length, height, or size, the above positioning step rapidly and accurately places the bird in proper position with respect to the needles or other treating parts.

DRAWINGS

In the accompanying drawings,

FIG. 1 is a side view in elevation of a typical dressed poultry carcass held between clamping elements;

FIG. 2, a front view in elevation of apparatus embodying our invention and useful in carrying out our treating process;

FIG. 3, a side view of the apparatus shown in FIG. 2;

FIG. 4, a top plan view of track means for the conveying of the carcass through the treating apparatus;

FIG. 5, a side view of the apparatus shown in FIG. 4;

FIG. 6, a broken detail side view in elevation of the side rail structure for engaging a knee joint of the carcass and the needle-applying mechanism carried by the side rail;

FIG. 7, a broken detail view of the needle support structure and limit switch carried thereby;

FIG. 8, a view in side elevation of support frame means for the breast needle-applying mechanism and means for actuating the hollow needles;

FIG. 9, a chart showing a preferred sequence in the operation of the timer control mechanism;

FIGS. 9A, 9B, and 9C are details of portions 1T, 2T and 3T, respectively, in FIG. 9;

FIG. 10, a perspective view of the apparatus prior to the placing of the carcass on the conveyor track;

FIG. 11, a view similar to FIG. 10 but showing the carcass placed in position against the centering post;

FIG. 12, a view similar to FIG. 11 but showing the pusher element pressing the carcass against the centering post;

FIG. 13, a view similar to FIG. 12 but showing the side rails advanced to bring the cam sockets against the knees of the carcass;

FIG. 14, a view similar to FIG. 13 but showing the knee needles moved down into injection position;

FIG. 15, a view similar to FIG. 14 showing the breast needles moved downwardly into injection position, thus with all needles in injection position;

FIG. 16, a view similar to FIG. 15 but showing the breast needles raised;

FIG. 17, a view similar to FIG. 16 but showing the thigh needles raised;

FIG. 18, a view similar to FIG. 17 but showing the side rails retracted;

FIG. 19, a view similar to FIG. 18 but showing the locator post retracted;

FIG. 20, a view similar to FIG. 19 showing the pusher element engaging the carcass for removing the same;

FIG. 21, a view similar to FIG. 20 but showing the carcass ejected by the pusher element from the injection area and showing also a spray nozzle mounted for spraying the rails after the removal of the cacass;

FIG. 22, a broken detail view of apparatus for supporting the locator post in position fo engaging the forward portion of the carcass;

FIG. 23, a view similar to FIG. 22 but showing the post being retracted;

FIG. 24, a top plan view of the structure shown in FIG. 22;

FIG. 25, a top plan view of the structure shown in FIG. 23;

FIG. 26, a schematic top plan view illustrating the action of the cam socket member in finding and engaging the knee of the turkey while the turkey is held between the centering post and pusher;

FIG. 27, a perspective view of the top portion of the cam socket advancing mechanism;

FIG. 28, a broken sectional detail view of the spring-supported cam socket carrying support;

FIG. 29, a perspective view of the cam socket and rail advancing mechanism;

FIG. 30, a schematic view showing the application of air pressure to the various operating cylinders; and FIG. 31, a schematic flow sheet of the fluid conduits leading from a source to the injection needles.

DETAILED DESCRIPTION

In General

Figure 4:
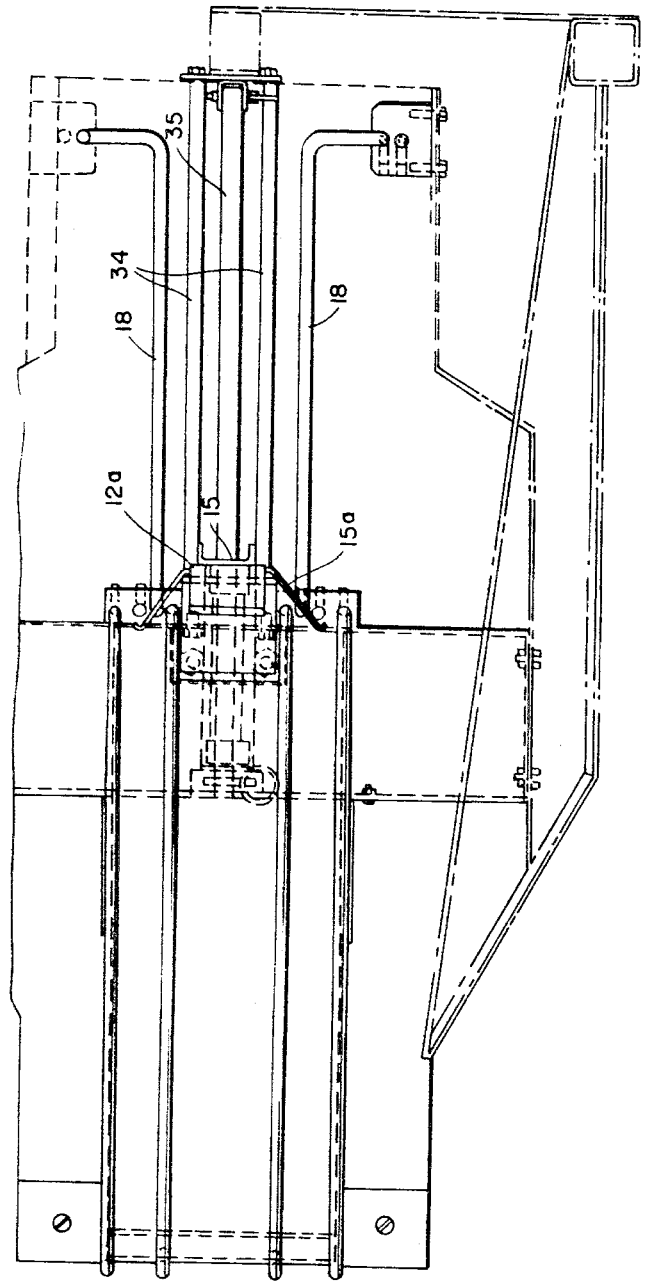

The apparatus and process are effective for anchoring a carcass in a firm position for the injection of fluid into the carcass or for other treating operations, while at the same time guiding or maintaining the treating needles or other implements so that they are effective in injecting fluid into the carcass meat without hitting the bone structure.

There are many treating processes which may be employed and which require for streamline processing a firm and centered positioning. For example, in the application through hollow needles, fluids including gases and liquids may be introduced. Such fluids may also be injected by pressure guns equipped with nozzles through which the material is injected into the carcass. The injected material may include seasoning material, such as lemon, onion, pepper, butter, smoke, and other flavors and flavor enhancers, such as sodium chloride, monosodium glutanate, disodium inosinate, disodium guanylate, etc. Solids, as well as liquids and gases, may be injected. Examples of solids are crystalline vitamins, iron-containing substances, calcium phosphate compounds, etc. Flavored water solutions and edible fat may also be injected. The edible fat may include edible oils and common edible animal fats, emulsions or mixtures thereof, such as, for example, butter, butter oil, corn oil, lard, cottonseed oil, corn oil margarine, and other well-known vegetable and animal fats and oils and margarines. The edible fat may be heated to a temperature at which it is fluid or plastic so that it may be injected by the applicator or needles into the meat body.

As stated above, an important achievement is the positioning of the highly-irregular bird carcass so that it is held for mechanical treatment such as has been above described, and also for various other treatments, such as slicing, quarter- and half-sectioning, etc.

FIG. 1 shows a typical carcass indicated by the numeral 10, the carcass resting upon its back and having its keel portion 11 engaged by a centering post 12. The wing portions 13 extend downwardly on each side. The ends of the legs 14 are secured by a wire clamp 14a which brings the legs together with their rear surfaces extending close to the posterior end of the carcass. A pusher member 15 engages the hock portion and backbone of the carcass and also the leg-ends to press the carcass forwardly against the locator post 12. The knee portion 16 of each leg is engaged by a cam socket or thigh locator plate 17 which receives and adjusts itself to the knee so the the leg bone is thus rigidly held between the pusher member 15 and the rail socket 17. There is thus a four-point anchoring of the carcass by elements which still leave the meat portion of the carcass exposed for treatment with hollow needles or other implements.

The general layout of the apparatus is shown in FIGS. 2 and 3, and for the purpose of illustration the apparatus and process are described in connection with a turkey carcass, and the treating apparatus by way of example is set out as hollow needle injection apparatus for the injection of fluids.

A turkey carcass is placed upon a track or cradle 18 in the position shown in FIG. 2, with the forward portion in contact with the centering post or keel bone locator post 12. The pusher element 15 has laterally-extending sides 15a and upwardly- and downwardly-flaring sides 15b for engaging the posterior end of the carcass including the backbone and the ends of the trussed legs 14. In effect, the pusher element forms a pocket which will engage the leg and hock portions of the carcass for pressing the same forwardly into clamped position against the post 12. Next, the slide rail cam socket 17 will be pressed forwardly into engagement with the knee portion 16 of the carcass. The socket structure carries a bracket 19 in which is mounted a pressure cylinder 20 actuating a manifold 21 carrying thigh-injection hollow needles 22. The socket member 17 is carried by side rails 23 carried within a casing 24 pivotally mounted at 25 upon the casing member 26a, thus permitting a swinging action of the cam socket to hunt and engage the knee, as shown in FIG. 1, for thus centering the socket with respect to the knee and at the same time positioning the thigh needles 22 so that they will miss the leg bone and pierce the leg and thigh muscles.

The breast muscle needles 27 are mounted upon manifold 28 carried within casing 29, the casing being supported upon an angle arm 30 forming a part of the main casing frame 26.

If desired, electric eye elements (not shown) may be provided on the frame arch so that the entire machine becomes inoperative until a carcass 10 is placed in position, as shown in FIG. 3, so as to break the light beam.

The apparatus is preferably provided with a drain pan 26c, as indicated best in FIG. 2.

The foregoing describes the general structure and operation of the process and apparatus, and detailed structure will now be set out.

Guide Tracks

Figure 5:
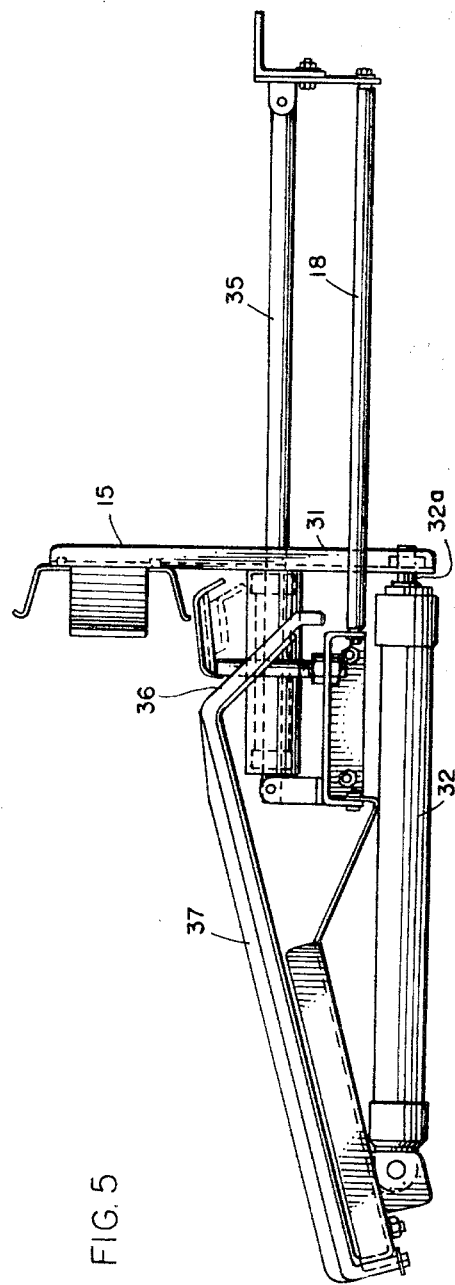

As shown best in FIGS. 4 and 5, we provide the spaced rods 18 as guide supports adapted to receive the back and back sides of the turkey carcass, and mounted for movement between the tracks 18 is the pusher element 15 which has a depending portion 31 secured to the piston rod of the hydraulic element 32. In FIGS. 4 and 5, the pusher element is shown in advanced position.

On each side of the pusher element 15 are vertical guide rods 34, and between the guide rods 34 is a slide shaft 35 for slidably supporting the leg hock pusher element 15. Extending forwardly of the cradle rods 18 are the upwardly- and forwardly-inclined guide rods 36 which have rearwardly-extending and downwardly-inclined portions 37 for later assisting in the ejecting of the injected carcass.

Thigh-Injecting Mechanism

A detail showing is set out in FIGS. 6 and 7 of the thigh-injecting mechanism which includes the thigh locator plate or cam socket 17 and the support bracket 19 on which is mounted the needle manifold 21 and communicating needles 22. The needles are depressed by a hydraulic cylinder element 20 and the rods 20a and 20b serve as guide rods. The thigh locator or cam 17 is supported by rails 23 mounted within a casing 24 carried by frame bracket 38 on the main frame 26, and a pair of hydraulic cylinders 39 is effective for moving the plate 40 carrying the rails 23 forwardly. 41 designates a cylinder bracket support rod, and 42 designates tubular guides in the casing 24 for the movement of the rails 23 carrying the locator plate or cam forwardly and rearwardly.

Figure 29:
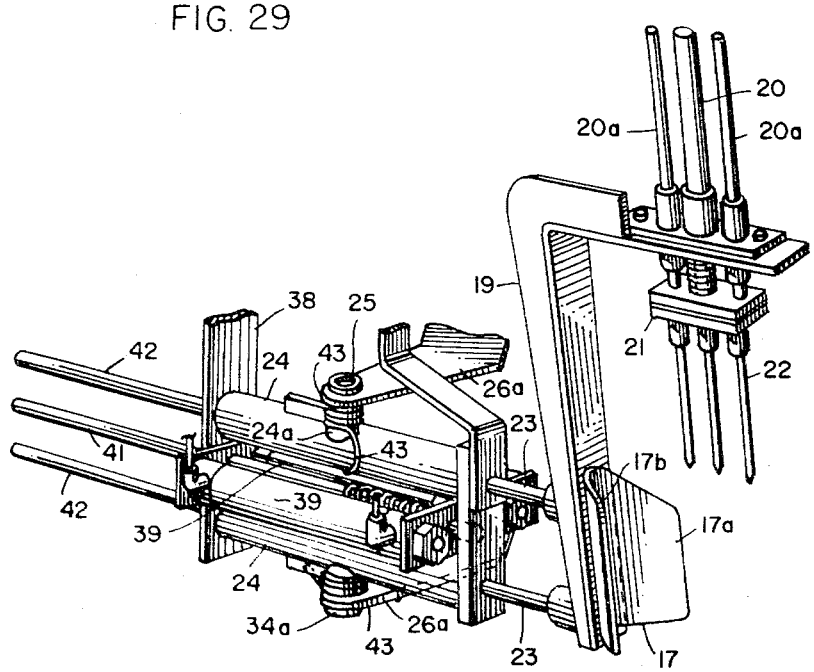

As shown best in FIGS. 29 and 27, the air cylinders 39 face in opposite directions and are activated in tandem to provide a long stroke of the cam jacket 17 on rails 23 sliding in the tubular guides 42. Springs 43 bias the rail frame 24 upon vertical pivot 25 to urge the cam sockets 17 inwardly and to bring the pin stop 44 against shoulder 45 on bracket 38.

As shown more clearly in FIG. 7, 47 designates a switch bracket on support 48 and supporting the thigh manifold cylinder 20 on the thigh manifold guide rods 20a. Mounted upon the bracket is a switch 49 for the thigh manifold switch injection actuator and the same is controlled by a spring 49 urging trigger 50 which limits the depth of penetration of the needles.

The side slide rails supporting the knee-engaging elements 17 are inclined inwardly and rearwardly on both sides so that when moved rearwardly they move inwardly into engagement with the bird's knees, while when they are retracted they move forwardly and outwardly to free the space ahead of the bird so that it can be ejected by the pusher 15.

FIG. 6 indicates a spray nozzle 51 which preferably is positioned for spraying the cradle and guide rods on which the carcass moves after the carcass has been ejected so as to clean the tracks for the next carcass.

Breast-Injection Mechanism

In FIG. 8, a detail showing of the breast-injection mechanism is set out. Above the casing 29 is a housing 52 in which is mounted a manifold cylinder 53 for pressing downwardly the manifold 28 carrying the hollow needles 27. Above the manifold is an inlet tube 54 leading from a pressure source of fluid, such as, for example, corn oil margarine. 55 indicates manifold adjustment rod screws, and 56 indicates one of two manifold adjustment rods. At the top of the housing 52 is an air inlet and exhaust 57 leading to the air pressure operated cylinder 53.

Extending below the manifold 28 is a switch member 58 which on contact with the surface of the carcass actuates a switch for stopping further descent of the manifold and this serves as a depth penetration limit. The switch actuator rod extends upwardly to the switch 59 to stop downward movement of the manifold after the element 58 engages the carcass.

Wiring Layout

FIG. 9 sets out a wiring layout which utilizes switches and actuators in various portions of the apparatus for accomplishing sequential operations as described fully in FIG. 9 for a preferred sequence. It will be understood that this sequence may be varied as desired, but the sequence illustrated is one which has been found satisfactory. The symbols used in the wiring layout in FIG. 9 are standard symbols and electrical abbreviations known as J. I. C. standard. (Joint Industrial Council). In addition to such symbols, the operation is described in detail in FIG. 9. On the righthand column of the figure, the individual elements shown in the lefthand column are shown in enlarged form for clarity.

Sequence of Operation for Injection Machine

Figure 10:
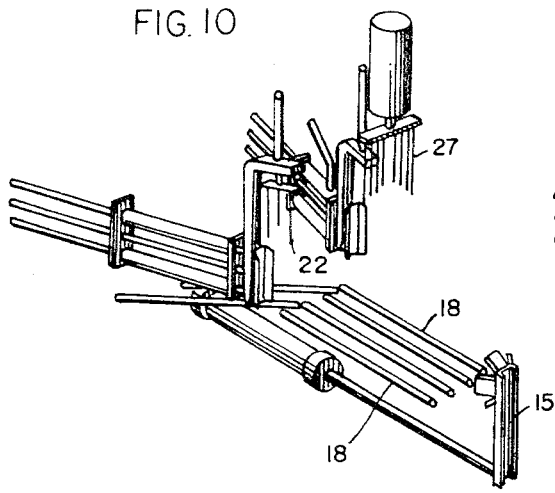
Figure 11:
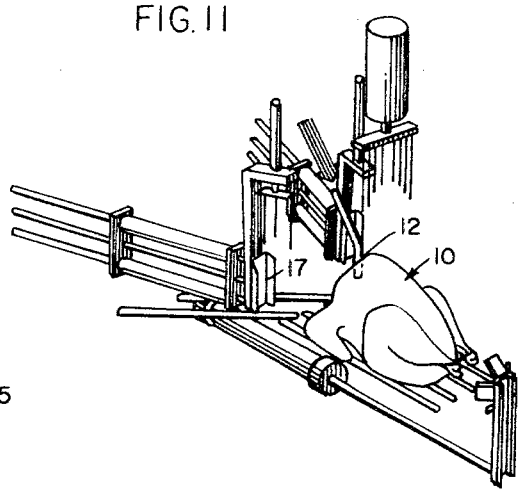

In FIGS. 10 to 21 are sequential operations similar to the operations described in FIG. 9. In FIG. 10, the cradle rods 18 are shown empty, and in FIG. 11 a turkey carcass 10 has been placed in position against the locator post 12. While the post or abutment 12 may be of any suitable type of structure for engaging the anterior part of the bird, we have discovered that the anatomy of the bird can be utilized very effectively in centering the carcass, irrespective of its size or configuration, so that upon the clamping of the bird against the post the injection needles can be operated without fear of their penetrating any of the bone structure.

The anatomy of the bird which is utilized is the notch at the forward end of the sternum or breast bone. We have discovered that this notch at the forward end of the bird can be effectively used as a centering means so that when the pusher element is advanced and the notch engages the depending vertical locator post, the bird, irrespective of its size and configuration, will be held accurately with respect to the injection needles. Thus, the notch and centering post serve as a key for guiding the needles so that they invariably miss the keel and other bone structure while still coming close to the keel to provide the desired injection.

Figure 12:
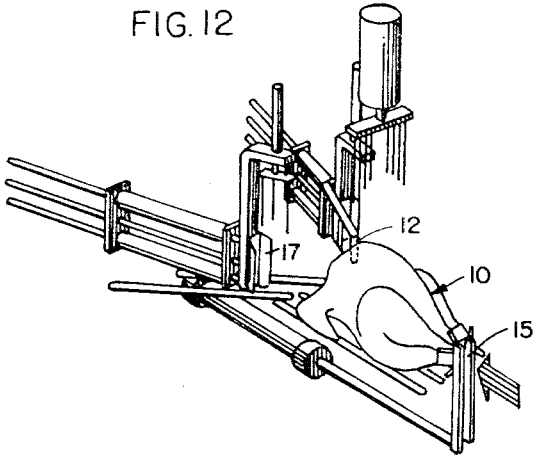
Figure 13:
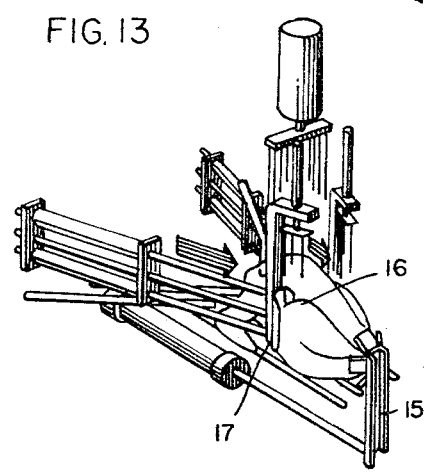

FIG. 12 shows the pusher element advanced to complete the centering operation. FIG. 13 shows the knee locator rails advanced to bring the cam socket or thigh locator plate 17 into engagement with the knees 16 of the turkey carcass 10.

Figure 14:
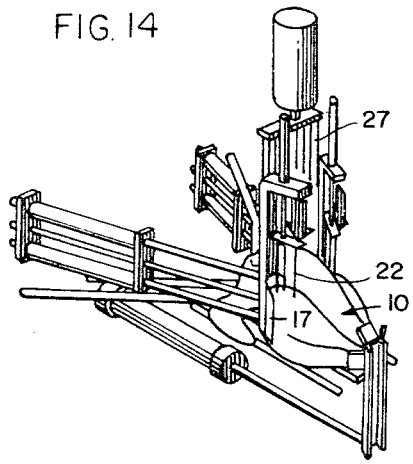
Figure 15:
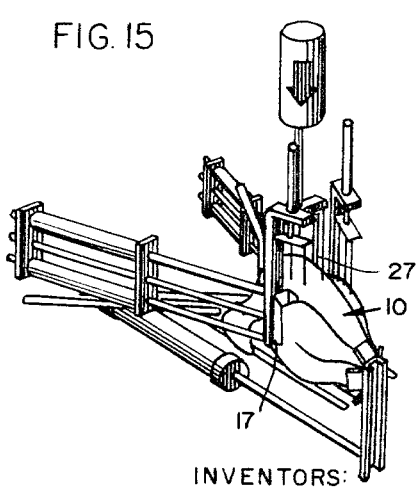

FIG. 14 shows the depression of the thigh needles 22, and FIG. 15 shows the depression of the breast needles 27.

Figure 16:
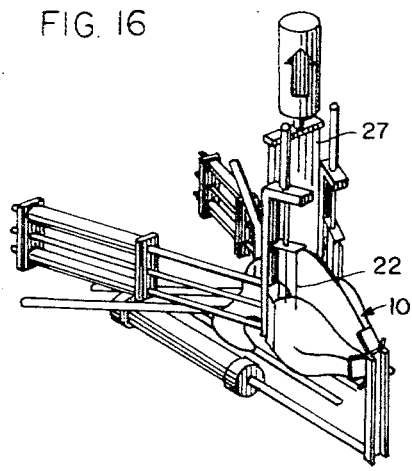
Figure 17:
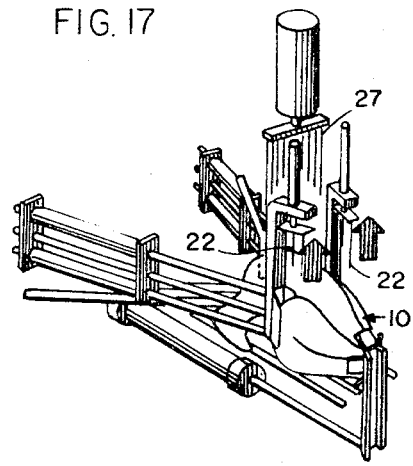

The withdrawal of the needles is shown in FIGS. 16 and 17, the breast needles 27 being withdrawn in FIG. 16 and the thigh needles 22 being withdrawn in FIG. 17.

Figure 18:
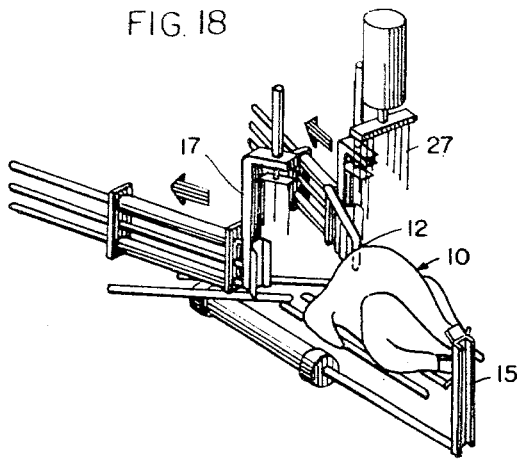
Figure 19:
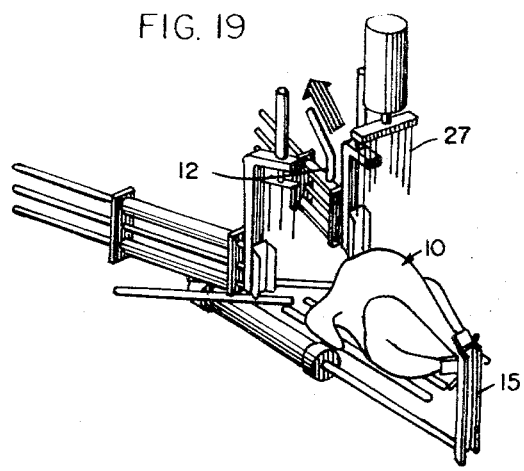
Figure 20:
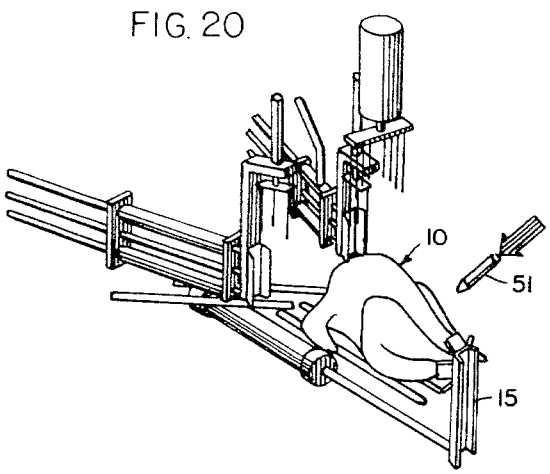
Figure 21:
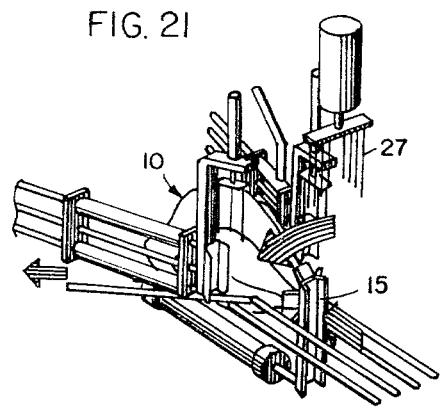

FIG. 18 shows the retraction of the thigh locator plate mechanism 17, the withdrawal being at an angle outwardly and rearwardly so as to open the area in front of the bird to permit its ejection. At this point, however, the locator post 12 still retains the carcass 10. FIG. 19 shows the locator post 12 raised, and the pusher element 15 is now free for ejecting the bird forwardly and down the incline discharge guide 37, the discharge being shown in FIGS. 20 and 21. After the discharge, the spray nozzle 51 delivers wash water for cleaning the track rods.

Operation of Locator Post

The locator post structure in operation is shown best in FIGS. 22 and 25. The post 12 has a flared portion 12a which causes it to engage the support 12b and to hold it rigid against the pressure exerted by the pusher element through the medium of the carcass. However, the post member swings upwardly and freely when the post-actuating mechanism is retracted. The post is carried by pivot 60 upon the bracket member 61 which is fixed to a pivot rod 62 guided within an arcuate slot 63 in the slide frame members 64. A piston rod 65 pivotally engages the member 61 and extends within the hydraulic cylinder 66 which in turn is pivoted upon the frame 30 at 67. FIG. 22 and FIG. 24 show the locating post in lowered position for engaging the carcass when it is pushed forward, while FIG. 23 and FIG. 25 show the post in elevated and inoperative position.

The operation of the cam socket 17 is shown graphically in FIG. 26, the cam socket 17 swinging upon pivots 25 into engagement with the knees 16 of the turkey 10 after the turkey has been secured by moving the presser 15 against the rear of the turkey to move the V recess at the front of the turkey into engagement with the post 12.

We prefer, however, to cause the engagement of the cam with the knee to be relatively gentle in the initial contact so that the cam can cause the socket to swing into snug contact with the knee, at which time the full force of the cylinders will be brought to bear in urging the cam socket against the knee. To provide a yielding contact, the rail 23, as shown best in FIG. 28, is slidably mounted within a rail member 23a and is urged forwardly by spring 60. The member 23 is preferably slotted at 61 to receive a pin 62 limiting the inward movement of member 23. If desired, the slide 23 may be provided with a second spring 63. Thus, the engagement of the cam socket with the knee is initially a gentle engagement allowing the cam socket to adjust itself to the knee before a firm engagement is made.

While a single hydraulic cylinder may be employed, we have shown two cylinders 39 having their piston rods 39a and 39b extending in opposite directions, and the cylinders are operated in sequence to produce the desired long stroke. The frame members 24 are each provided with vertical sleeves 24a welded thereto and vertical pivots 23 extend through the supporting brackets 26a so as to mount the frame member 24 pivotally upon the frame members 26a. Thus, the entire support mechanism for the cam socket 17 may swing along a relatively vertical pivot to allow the cam socket to hunt and find the knee and thus to locate the needle-injecting needles 22 with respect to the leg of the turkey. The inwardly-extending cam portion 17a of the cam socket 17, which is normally urged inwardly by springs 43, first engages the knee and guides the support mechanism into firm contact with the knee, and in this operation the relatively straight portion 17b of the cam socket extends between the knee and the side of the turkey breast, as shown best in FIG. 27. With the socket portion 17b extending snugly between the knee and the breast of the turkey, as shown best in FIG. 27, the needle bracket is held firmly in a position in which the needles must miss the leg bone and pass through the leg muscle and thigh muscle laterally of the bone.

Not only is the cam socket member 17 pivotally mounted for lateral movement but also, as shown best in FIGS. 6 and 29, the cam socket is elongated so that it can fit turkeys or other poultry of widely-varying sizes. Thus, both the cam socket 17 and the centering post 12 are vertically elongated to adapt the apparatus to poultry carcasses of different sizes.

Flow Sheets

Figure 30:
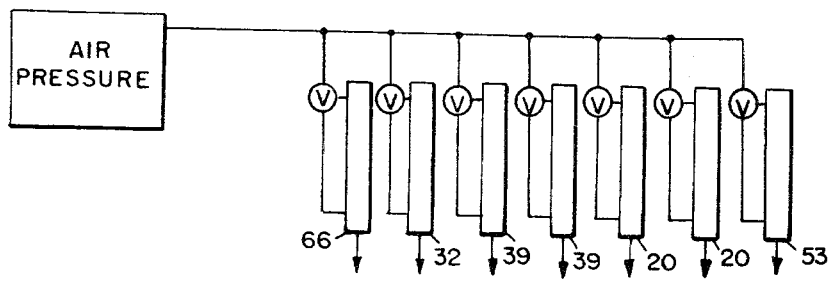

In FIG. 30, there is set out a diagram of the flow of air to opposite ends of cylinders 66, 32, 39, 20 and 53, together with valve means for controlling the action of the cylinder pistons.

Figure 31:
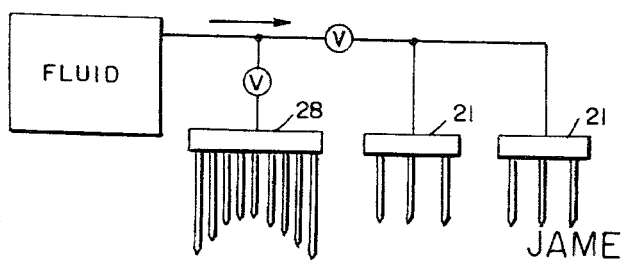

In FIG. 31, there is set out a source of fluid, which may be edible fat or any of the various fluids heretofore described, through flow lines to the manifolds 28 and 21.

Illustrative Operation

The operation of the apparatus can be carried out in a number of ways, with the operations proceeding in different sequences at the option of the operator. One optional procedure may be set out as follows and in conjunction with the showing in FIG. 9:

1. The operator manually slides or places the bird into position on the support rods 18 with the forward end of the breast bone pushed against the breast bone locator post 12, the notch receiving the post.

2. The operator depresses two start button switches 1PB1 and 1PB2, as indicated on FIG. 3, to start the cycle.

3. These switches energize and set up delay timer 1TR and the two-position double solenoid valve 1SOL which actuates the bird clamp cylinder 32 and advances the pusher 15 until the bird is clamped securely against the locator post 12.

4. When the pusher 15 moves forward approximately two inches, the device will actuate the one-way roller switch 2LS.

5. Limit switch 2LS momentarily energizes the two-position double solenoid valve 2SOL which extends the two sets of thigh manifold transfer cylinder rods or side rails 23 and advances the thigh manifolds 19 until the manifolds are properly positioned over the bird legs and thighs.

6. Near the end of the thigh manifold transfer or side rail stroke, the two transfer mechanisms will actuate two limit switches 3LS and 4LS which are wired in series.

7. The two limit switches 3LS and 4LS, through the closed contacts of delay timer 1TR, will energize the maintained contacts of the three breast and thigh manifold three-position double solenoid valves — 3SOL, 4SOL and 5SOL — which extends the cylinder rods and starts the manifolds down to the bird injection position.

8. When the manifolds reach the injection position individually, sensing rods 58 and 50, mounted in the breast manifold and in the two thigh manifolds, are depressed by contact with the keel bone and the thigh joints which in turn actuate the three limit switches 5LS, 6LS and 7LS mounted on the three manifolds.

9. Individual and separate actuation of the switches causes two functions to happen simultaneously at each manifold:

a. The switches 5LS, 6LS and 7LS, which are wired in series with solenoid valves 3SOL, 4SOL and 5SOL, will open power circuits from switches 3LS and 4LS to the solenoid valves 3SOl, 4SOL and 5SOL causing the valves to return to center neutral position which in turn stops the down travel of the manifolds.

b. The switches will also close secondary circuits to start injection cycle timers 1T and 2T which in turn energize the pressure regulator valve solenoids 6SOL and 8SOL and thereby releases the pressurized basting oil to the injection manifolds and needles.

10. When timers 1T and 2T time out, the circuits are opened to solenoid valves 6SOL and 8SOL. The valves close and the flow of basting oil to the manifolds and needles is stopped.

11. Timers 1T and 2T also energize and set up "ON" delay timers 2TR and 3TR.

12. When timers 2TR and 3TR time out, the timers will energize and set up "OFF" delay timers 4TR and 5TR.

13. When timers 4TR and 5TR set up, the timers will close contacts and energize solenoid valves 9SOL, 10SOL and 11SOL which in turn retracts the cylinder rods to the thigh and breast manifolds and return the manifolds to the up position.

14. Timer 5TR will also energize and set up "ON" delay timer 7TR.

15. When timer 7TR times out, the timer will close contacts and energize solenoid valve 12SOL which in turn retracts the side rails (thigh manifold transfer cylinder rods) 23 and returns the thigh manifold mechanisms 21 to the start position.

16. As the thigh manifolds 21 near the retracted start position, the transfer mechanisms will actuate two limit switches 9LS and 10LS wired in series, the first switch 10LS being being a maintained contact switch and the second switch 9LS being a momentary pulse type.

17. The momentary pulse from switches 9LS and 10LS energizes solenoid valves 13SOL which in turn retracts the breast bone locator post 12.

18. As the locator post 12 retracts up and back, the maintained pressure applied by the clamp cylinder 32 on pusher 15 will move the bird forward to the bird discharge chute 37.

19. At the bird discharge position, the clamp cylinder mechanism 32 will actuate switch 11LS.

20. The pulse from switch 11LS will cause two functions to happen simultaneously:
   a. The pulse energizes solenoid valve 14SOL which extends the clamp cylinder rod and returns the bird clamp rod to the start position.
   b. The pulse also energizes solenoid valve 15SOL which extends cylinder rod 32 and returns the locator post 12 to the down start position.

21. As the bird slides down the ejection chute 37, it trips switch 12LS.

22. Switch 12LS starts timer T3 which in turn energizes and sets up "ON" delay timer 6TR.

23. When timer 6TR times out, the timer contacts close to energize solenoid valve 16SOL, releasing hot water to spray nozzles 51. At the start of the shift, the operator depresses "ON" master power switch 2PB (push button-momentary contact type switch). The operator will maintain pressure on the two cycle start switches until a buzzer 1ABU sounds signalling the start of the basting oil injection. If the operator releases either one or both of the switches before the buzzer sounds, the manifold down stroke cycle will be interrupted and the manifolds will come to an immediate stop.

24. When timer T3 times out, the circuit to the water solenoid valve 16SOL is opened, stopping flow of water to the wash down nozzle 51. This completes the cycle.

While in the foregoing specification we have set out specific examples of the process and apparatus in considerable detail, it will be understood that such details may be varied widely by those skilled in the art without departing from the spirit of our invention.

We claim:

1. A method for positioning a poultry meat body having a V-shaped notch to facilitate treatment of said body, comprising supporting said body from the underneath side, pressing said body rearwardly from within and at the apex of said V-shaped notch, and pressing said body forwardly from the rear side thereof whereby said body is held between said three points of engagement.

2. The method of claim 1 in which said meat body includes legs with forwardly-facing knees and said rearward pressing is against said knees.

3. In a process for positioning for treatment a dressed poultry caracass having a leg end terminating at the rear of the carcass and having a forwardly extending knee, the steps of supporting the carcass back-side down, and pressing said leg portion forwardly at said leg end and rearwardly at said knee to clamp said portion and hold it against forward or rearward movement.

4. In a process for positioning for treatment a dressed poultry carcass, the steps of supporting a carcass from below the carcass with an end of said carcass adjacent an abutment, holding said abutments stationary to prevent movement of the carcass beyond said abutment while pushing the carcass toward said abutment to clamp said carcass in position for treatment, and following said treatment raising said abutment and pushing said carcass beneath said abutment.

5. A process as set forth in claim 4 including the step of moving said abutment away from of said carcass and out of contact with said carcass before it is raised to permit movement of said carcass thereunder.

6. In a process for positioning for treatment a raw dressed poultry carcass having its leg ends terminaitng at the rear of the carcass, said carcass having a breast bone and a central notch forward of said bone, the steps of supporting the carcass backside down with the front end of the carcass adjacent an abutment and said abutment lodged within said notch, and while holding said abutment against forward movement pushing the carcass forwardly to clamp it against said abutment.

7. In a process for positioning for treatment a raw dressed poultry carcass having its leg ends terminating at the rear of the carcass and having its knees extending forwardly, the steps of supporting the carcass backside down with the front end of the carcass adjacent an abutment, while holding said abutment against forward movement pushing the carcass forwardly to clamp it against said abutment, and while said carcass is so clamped exerting rearward pressure on said knees.

8. A process as set forth in claim 6 including the step of raising said abutment after said treatment to permit forward movement of said carcass.

9. A process as set forth in claim 6 wherein the leg ends are trussed together and the pushing is against said trussed leg ends at the rear of the carcass.

* * * * *